Patented Nov. 6, 1945

2,388,601

UNITED STATES PATENT OFFICE 2,388,601

POLYMERIZATION OF VINYL ESTERS

Henry Michael Collins, Shawinigan Falls, Quebec, Canada, assignor to Shawinigan Chemicals Limited, Montreal, Quebec, Canada, a corporation of the Dominion of Canada No Drawing. Application September 4, 1942, Serial No. 457,338. In Canada August 22, 1942

4 Claims. (Cl. 260—87)

INTRODUCTION

This invention relates to the manufacture of suspensions of coarse grained vinyl ester polymers.

Crawford U. S. Patent No. 2,194,354, proposed forming an aqueous suspension of a vinyl ester in the presence of a particular dispersing agent and polymerizing the vinyl ester in this suspension, the concentration of the dispersing agent and other conditions being so regulated that on cessation of stirring, the polymer will settle out immediately. The applicant has found that, in practice, it is difficult to regulate such a process to obtain on one hand a suspension of a coarse grained polymer as opposed to a fine grained emulsion and on the other hand, to prevent premature settling of the dispersed phase.

OBJECTS

Having regard to these difficulties, it is an object of the present invention to provide for the production of aqueous coarse grained dispersions of polyvinyl esters which retain their stability for some time after their formation; a method of polymerizing vinyl esters in suspension in which the particle size of the polymer can be controlled within practical limits while still retaining suspension stability; to provide a process and products having other advantages as will be evident from the following disclosure.

This process will be briefly outlined in principle as follows, the individual steps to be discussed later in more detail.

The monomeric vinyl ester is dispersed in water by the addition of a moderate concentration of dispersing agent, such as a high molecular weight organic hydrophilic colloid substantially neutral as to pH, under conditions of depressed surface tension preferably induced by the presence of an anionic surface-active agent, and relatively high speed stirring. The dispersed ester is then polymerized rapidly under reflux, with the stirring continued. The result is a coarse grained suspension of the polymer capable of being recovered and handled as such. The polymer may be removed from the suspension, for instance, through precipitation by dilution. When washed, the precipitate is a grainy non-sticking "sand" of the polymer, capable after proper drying, of being shipped as a flowable product. These results could not be gathered by prior art procedures.

EXAMPLES

In order that the invention may be understood in more detail, various embodiments are illustrated in the following examples. These examples are intended as explanatory only and not as limiting to the scope of the invention.

In the procedures described a kettle equipped with a reflux condenser, is employed. One type of equipment, as used substantially according to the following conditions, includes an aluminum pot about 8 inches high by about 6 inches in diameter having a concave bottom and no baffles. The stirrer is of stainless steel. It embodies about half an inch from the bottom 4 blades in a cluster about 1 inch x ½ inch bent at about 45° for downward thrust; about four inches from the bottom, a pair of blades about 2½ inches x ¾ inch bent at about 45° for downward thrust. The useful speeds, R. P. M. of the blades are about 500 to about 1500.

Example I

In one run the charge is substantially as follows:

| | | |
|---|---|---|
| Gum tragacanth | per cent | [1] 0.25 |
| "Aerosol O. T." | do | [1] 0.1 |
| Water | grams | 537 |
| Vinyl acetate | do | 690 |
| Benzoyl peroxide | do | .69 |
| Stirring speed | R. P. M. | 700 |

[1] Taken by weight on the total charge.

The gum tragacanth and the "Aerosol O. T." are put into a solution and added to the water in the reflux apparatus. This charge is mixed by stirring rapidly for about one minute. To this solution the vinyl acetate is added slowly with stirring, which is continued for about five minutes. The benzoyl peroxide catalyst is then added, the charge stirred in the cold briefly and the whole charge brought to reflux temperature of about 66° C. by manipulation of the jacket of the kettle. Stirring is continued at about 600 R. P. M. The run is completed when the temperature has reached about 80° C. to 85° C. The time at reflux is about two hours.

The results of the run are substantially as follows:

| | |
|---|---|
| Temperature: { Minimum, 56° C. <br> Maximum, 83° C. | |
| Time of polymerization | 2 hours |
| Condition of suspension | Stable |
| Residual vinyl acetate | 1.6% |
| Total solids | 51% |
| Emulsion viscosity | 600 centipoises |
| Particle size of p. v. a | 250 microns |
| Polyvinyl acetate viscosity | 100 centipoises |

A sample taken from this suspension remained stable for about 72 hours and then the polymer settled out. Upon subjection to stirring the suspension was readily reformed.

Another sample was rapidly diluted by adding an excess of cold water. This resulted in the precipitation of the granular polymer of substantially the grain size indicated.

Samples taken of the precipitate in each of the two previous samples when properly dried resulted in a free flowing "sand" of the polymer.

Example II

The following materials are employed in substantially the concentrations given.

Methyl cellulose (high viscosity) per cent__ [1] 0.5
"Aerosol O. T." _____do____ [1] 0.1
Vinyl acetate _____grams__ 690
Water _____do____ 537
Benzoyl peroxide _____do____ [2] .69
Stirring speed _____R. P. M__ 700

[1] Taken by weight on the total charge.
[2] 0.1% on monomer.

With these materials making up the charge, a run is carried out in a similar manner to that of Example I with substantially the following results:

Temperature: { Minimum, 56° C.
              { Maximum, 83° C.
Time of polymerization _____ 2 hrs. 40 mins.
Condition of suspension _____ Stable
Residual vinyl acetate _____ 1.2%
Total solids _____ 50%
Emulsion viscosity _____ 280 centipoises
Particle size of p. v. a _____ 300 microns
Polyvinyl acetate viscosity _____ 110 centipoises Precipitation of the sample taken from the suspension formed results in the formation of a non-sticking flowable "sand" of the polymer. The particle size of the polymer globules was in the neighborhood of 300 microns.

Example III

A run was carried out repeating the conditions of Example I with the exception that about 0.25% of a commercial colloid known as "Gomagel" was employed instead of gum tragacanth.

Results of the run were substantially as follows:

Temperature: { Minimum, 56° C.
              { Maximum, 83° C.
Time of polymerization _____ 1 hr. 45 mins.
Condition of suspension _____ Stability good
Residual vinyl acetate _____ 1.0%
Total solids _____ 49%
Emulsion viscosity _____ 600 centipoises
Particle size of p. v. a _____ 200 microns
Polyvinyl viscosity _____ 100 centipoises

Examples IV–VIII

The examples given in the following table demonstrate the effect of changing variable factors influencing the particle size. According to the approximate conditions set out in the table, runs are carried out substantially as in Example I. In all cases, with the exception of Example VIII, "Aerosol O. T." was employed as a surface tension depressant at a concentration in the neighborhood of 0.1% by weight of the total charge.

| Ex. | Catalyst | Approximate time | Approximate stirring speed, R. P. M. | Dispersing agent | Approximate particle size |
|---|---|---|---|---|---|
|  | Percent | Mins. |  |  |  |
| IV | 0.3 | 75 | 1,200 | 0.3% gum trag. | 200 microns. |
| V | 0.06 | 180 | 1,200 | 0.3% gum trag. | 50 microns. |
| VI | 0.3 | 60 | 600 | 0.2% gum trag. | 600 microns. |
| VII | 0.3 | 80 | 1,200 | 0.6% gum trag. | 10— microns. |
| VIII | 0.06 | 170 | 600 | 0.3% gum trag. | 2,000 microns ppte. |

The Examples IV to VII demonstrate the effect on the polymer globule size, of changing the concentrations of catalyst, dispersing agent and/or the stirring speed. Example VIII demonstrates the effect of omitting the surface tension depressant at a relatively low concentration of dispersing agent at a relatively low stirring speed.

The product resulting from precipitating samples taken from the emulsions of Examples IV to VII after suitable washing was a non-sticking, flowable "sand" of the polymer. The particle size of this "sand" is indicated approximately in the table.

Example IX

Another run was carried out substantially according to the procedure of Example I with the exception that the following materials were employed in the approximate concentrations given:

Gum tragacanth _____per cent__ [1] .28
"Aerosol O. T." _____do____ [1] .1
Vinyl acetate _____grams__ 900
Water _____do____ 800
Acetaldehyde _____c. c__ 30
Hydrogen peroxide (28% solution) ____c. c__ 70
Sodium bicarbonate _____grams__ 12

[1] Taken by weight on the total charge.

The gum tragacanth and the "Aerosol O. T." are put into a solution and added to the water in the kettle. This charge is mixed by stirring rapidly for about a minute and to this solution the vinyl acetate is added slowly with stirring which is continued for about 5 minutes. The hydrogen peroxide catalyst, the sodium bicarbonate accelerator and the acetaldehyde, as a reaction controlling agent, are then added. The whole charge is stirred in the cold briefly and then brought to reaction temperature substantially as in Example I.

The results of the run are substantially in accordance with the following figures.

Temperature: { Minimum, 64° C.
              { Maximum, 84° C.
Time of polymerization _____ 1 hr. 25 mins.
Residual vinyl acetate _____ 1%
Total solids _____ 51%
Emulsion viscosity _____ 400 centipoises
Polyvinyl viscosity _____ 4 centipoises
Particle size of p. v. a _____ 600 microns As will be seen by reference to the examples, the applicant has found that to maintain stability in the resulting suspension, commensurate with a large particle size and the ability to produce subsequent precipitation of the polymer, particular conditions are necessary. These conditions generally involve the adjustment of catalyst concentration, nature and concentration of dispersing agent, stirring speed and the use of a surface tension depressant.

DISPERSING AGENT

The dispersing agent is a high viscosity organic colloid of the type, which is not usually effective by itself when used in relatively low concentrations, adequate to stabilize the dispersion. In the present instance, this colloid serves merely as a dispersing agent capable of forming a suspension which will retain its stability for a time after manufacture. Among colloids of this type are gum tragacanth, high viscosity celluloses such as glycol and methyl cellulose, algae such as agar-agar and the commercial product known as "Gomagel."

The action of the colloidal agent is assisted by depressed surface tension in the system. The applicant has found that this depressed tension is important at the low concentration of dispersing agent, which is desirably employed to obtain a coarse grained product. It assists in maintaining the stability of the suspension by preventing coalescence of the particles and the syneresis around the particles, which would tend to cause their immediate precipitation. The effect of the reduced tension is to lower the potential free energy of the emulsion system. Depressed tension may be achieved by using a surface tension depressant with the colloid. The preferred surface tension depressant is known under the trade name "Aerosol O. T." (the sodium sulphonate of dioctyl succinic ester). There are many other depressants which will serve the same purpose, for instance, the other aerosols, "Aresklene" (dibutyl phenyl phenol sodium disulphonate), "Decerosol O. T." (the dioctyl ester of sodium sulphosuccinic acid), fatty acid soaps of diethanolamine, fatty acid soaps of hydroxyethyl ethylene diamine, sulphonates of high alcohols and alkyl aryl type wetting agents. These surface tension depressants are selected from the class known in the art as anionic surface-active agents. See J. Ind. Eng. Chem. vol. 35, pp. 107–117, 1943. In fact, any surface tension depressant can be employed which is compatible and non-reactive with the other constituents of the charge, and is effective to reduce the surface tension of the system thus assisting in maintaining its stability.

CONCENTRATIONS

According to this procedure, the concentration of colloid is kept at a minimum. Its action is aided by the reduced surface tension to maintain stability of the system during and after polymerization. The colloid is present at a moderate concentration for instance, in the case of gum tragacanth, in the approximate range of concentration of about 0.2% to about 0.8% or preferably between about 0.2% and about 0.4% by weight of the total charge or, a corresponding amount in the case of colloids having greater or lesser capacity to act as emulsifiers according to the present conception, where the stirring is of the order of 500 to 1200 R. P. M. in an apparatus of the type described above. In any event the colloid is present in an amount effective to form and protect the dispersion so that it is, to all intents and purposes of the present invention, stable. That is, it is stable at least until it has been cooled and removed from the apparatus. Usually this stability persists for several hours to several days. A suitable concentration of the surface tension depressant is between about 0.05% and about .3%.

As will be well understood from the prior art, an increase in the concentration of emulsifier will increase the stability of the emulsion. On the other hand, the effect of such increase is to decrease the particle size, which is opposed to the object of this invention. In order to obtain a particle size of between about 50 to about 1000 microns, it is necessary to keep the concentration of dispersing agent present to a practical minimum for the other conditions employed. The applicant has found that this can be done and premature coagulation avoided, by the use of the colloid assisted by the surface tension depressant and appropriate stirring. If a colloid alone is used, stability is achieved at the sacrifice of a large decrease in particle size.

The speed of stirring has also been found important in achieving the desired particle size and also in maintaining the stability of the suspension. The stirring speed will of course depend to some extent on the size and nature of the apparatus employed. With the particular type of apparatus used in this application the applicant has found that speeds between about 500 and about 1500 R. P. M. can be used but the preferred speed is in the neighborhood of 1200 R. P. M. The stirring speed is tied in with the capacity of the dispersing agent. If a particularly high viscosity dispersing agent is used, a lower stirring speed can be employed and vice versa. It must be remembered, however, that an increase in stirring speed enables less dispersing agent to be effective.

REACTION RATE

The speed of polymerization also has an effect on the particle size. If the time of reaction is protracted, the particle size will decrease and vice versa, hence it is necessary that the time of reaction be relatively brief. Since the time of polymerization again depends on the concentration of catalyst, stirring speed and other factors, these will have to be taken into consideration in achieving the desired results as regards particle size. The applicant has found that generally the conditions should be regulated so that the time of polymerization, that is, the time at reflux is in the neighborhood of one to three hours. The reflux rate is kept high, in the neighborhood of 3% to 4% of the total charge per hour.

These conditions can usually be achieved by catalyst concentrations, where the catalyst is hydrogen peroxide, of between about .01% and about 2% (available oxygen between about .0047% and about .94%). With hydrogen peroxide, an alkaline accelerator should be used at concentrations effective to adjust the pH of the charge prior to polymerization to between about 6.5 and about 9. Any suitable accelerator may be employed as for instance, sodium bicarbonate. Where benzoyl peroxide is used as the catalyst, the concentration will be between about .1% and about 4%. Where a high concentration of catalyst is used and there is a tendency for reaction to go out of control, a controlling agent may be used, preferably an aldehydic body such as acetaldehyde. The control of reaction conditions particularly those effective to give polymers of predetermined viscosity are dealt with more fully in Kiar co-pending application Serial No. 457,339 filed Sept. 4, 1942.

According to the present invention, it is preferred to have the vinyl acetate and water present in about equal amounts or for the vinyl acetate to be slightly in excess up to a maximum of about 70%. Within these limits, an increase in the concentration of vinyl acetate increases the stability of the resultant suspension. The ratio of vinyl acetate to water can be as high as about 70:30.

SUMMARY

To summarize, among the respects in which the process differs from the prior art, notably Crawford, are the following:

(1) The catalyst concentration is somewhat higher and consequently, the reaction time considerably lower, and the reflux rate higher.

(2) The stirring speed is generally higher.

(3) The concentration of the dispersing agent is generally lower than in the prior art, the relatively low concentration being effective under conditions of depressed tension and appropriate stirring.

(4) The ratio of monomer to water is generally higher.

These different conditions result in a suspension containing large discrete particles of polymer accompanied by reasonable stability of the suspension. This could not be predicted by the prior art from which two alternatives were prescribed, either, instability on cessation of stirring, or, stability accompanied by a small particle size, making the polymer recoverable only as a slimy mass.

THE PRODUCT

The product obtained in accordance with this process is a temporarily stable suspension containing discrete particles or globules of polymer varying from about 50 to about 300 microns, in size, depending upon the conditions employed. This suspension may be stored for a period before use. Recovery of the polymer may be accomplished by precipitation from the external phase, preferably through dilution, for instance, by the rapid addition of cold water. The resulting precipitate may be washed for instance, by stirring in a water bath and drawing off the top levels. This removes impurities such as salts, aldehydes, catalyst, etc. which might contaminate the resulting product. The washed material is a non-sticking "sand" of the polymer capable of being shipped as a flowable product when properly dried.

ADVANTAGES

The invention has several advantages. In the first place, control of the polymerization is facilitated by the fact that stability is maintained throughout the process and at least for a period thereafter, and thus a margin of safety provided, whereas the Crawford process referred to above is carried out at the border line between a stable and a non-stable product. Resulting as it does in the production of large grained particles of polymer which can be recovered very easily from the suspension, the present process offers a convenient way of preparing polymeric vinyl esters as compared with solvent methods. Other advantages will be apparent to those skilled in the art.

The process is particularly useful for the preparation of polyvinyl acetate, for instance, as compared with the solvent method. No solvent is necessary and hence solvent recovery apparatus can be dispensed with. The process is safer. The polymer is easily separated from the dispersion medium and may be easily freed from impurities. It is in a form which can be readily handled, that is, in granules as opposed to lumps or masses.

The present invention has been described as applied to the preparation of polyvinyl acetate in connection with which preferred results are exhibited. It is also applicable to other vinyl esters such as, for instance, polyvinyl butyrate, polyvinyl propionate and polyvinyl chloride. Copolymers of two or more of these esters may also be prepared.

The term "stable" is used to denote the capacity of the suspension to retain its form, as such, under the conditions encountered during polymerization and after cooling for a time, in contrast to the tendency of many suspensions to "break" under these conditions. According to the present invention, by which suspensions are made of relatively coarse discrete particles of polyvinyl esters, stability does not usually persist permanently, but generally for about 72 hours or more. That is, the suspensions are stable during polymerization and after stirring is discontinued and the emulsion cooled, and sufficiently long to allow them to be removed from the apparatus and treated at leisure. This condition may be described as temporary stability.

It will be understood that without departing from the spirit of the invention or the scope of the claims, various modifications may be made in the specific expedients disclosed. The latter are illustrative only and not restrictive, it being desired that only such limitations shall be placed thereon as may be required by the state of the prior art.

The sub-titles used throughout the specification are merely to simplify reference thereto and should otherwise be disregarded.

I claim:

1. A process for the manufacture of a coarse-grained suspension of a polyvinyl ester, which comprises suspending the vinyl ester at a concentration ranging from about 50% to about 70% of the total charge in an aqueous medium with stirring, in the presence of a dispersing agent of the group consisting of high molecular weight organic hydrophilic non-ionizable colloids in an amount selected from the range from about .2% to about .8% by weight of the total charge, in the presence of a surface tension depressant of the group consisting of anionic surface-active agents in an amount selected from the range of about .05% to about .3% by weight of the total charge, and in the presence of a peroxide catalyst effective at the temperatures of the reaction at a concentration effective to give available oxygen of between about .0047% and about .94% by weight of the vinyl ester, the amount of catalyst being effective to convert substantially all the vinyl ester to its polymer at temperatures from about 60° C. to about 85° C. in a time ranging from about 2 to about 3 hours, reflux being maintained at a high rate effective with the catalyst concentration to cause the polymer to occur in the form of globules ranging in size from about 50 to about 300 microns, the stirring and the nature and concentration of the dispersing and surface-active agents being effective to form a stable suspension of said globules in aqueous medium after the reaction is completed and stirring ceases.

2. A process in accordance with claim 1 wherein the vinyl ester is vinyl acetate.

3. A coarse-grained suspension of a polyvinyl ester, comprising, discrete globules of the polyvinyl ester suspended in water, the amount of polyvinyl ester ranging from about 50% to about 70% by weight of the total charge, said globules having a size ranging from about 50 to about 300 microns, said suspension being stabilized by the presence of a surface tension depressant selected from the group consisting of anionic surface-active agents at a concentration ranging from about .05% to about .3% by weight of the total charge and a substantially neutral highly viscous hydrophilic colloid at a concentration of between about .2% and about .8% by weight of the total charge, said suspension being stable in the absence of stirring, capable of being handled as such without breaking, and capable of being broken to recover the polyvinyl ester by the addition of cold water.

4. A coarse-grained suspension according to claim 3 wherein the polyvinyl ester is polyvinyl acetate.

HENRY MICHAEL COLLINS.